United States Patent [19]

Brachman

[11] 3,919,166

[45] Nov. 11, 1975

[54] FIRE RETARDANT POLYURETHANES AND POLYUREA-URETHANES HAVING IMPROVED PROCESSABILITY AND COLOR STABILITY

[75] Inventor: Armand Edward Brachman, Allentown, Pa.

[73] Assignee: GAF Corporation, New York, N.Y.

[22] Filed: May 31, 1972

[21] Appl. No.: 258,164

[52] U.S. Cl... 260/45.8 A; 260/2.5 AJ; 260/2.5 BB; 260/2.5 AM; 260/75 NP; 260/77.5 AM; 260/77.5 CH; 260/77.5 SS
[51] Int. Cl.$^2$............... C08G 18/38; C08K 5/15
[58] Field of Search..... 260/2.5 BB, 2.5 BE, 2.5 AJ, 260/2.5 AM, 77.5 SS, 45.8 A, 77.5 CH, 77.5 AM, 75 NP

[56] References Cited
UNITED STATES PATENTS

| | | | |
|---|---|---|---|
| 2,885,420 | 5/1959 | Spiegler | 260/77.5 SS |
| 3,281,379 | 10/1966 | Fontaine | 260/2.5 BB |
| 3,406,140 | 10/1968 | Polestak | 260/77.5 SS |
| 3,424,691 | 1/1969 | Newton | 260/2.5 BB |
| 3,459,628 | 8/1969 | Dixon | 260/2.5 BB |
| 3,600,266 | 8/1971 | Huntzinger | 260/2.5 BB |
| 3,676,380 | 7/1972 | McLaughlin | 260/2.5 AW |
| 3,692,707 | 9/1972 | Pruit | 260/2.5 AM |
| 3,723,392 | 3/1973 | Konig | 260/75 NP |
| 3,764,546 | 10/1973 | Feltzin | 260/2.5 AJ |
| 3,779,953 | 12/1973 | Papa | 260/2.5 AJ |

FOREIGN PATENTS OR APPLICATIONS

| | | |
|---|---|---|
| 1,926,661 | 11/1970 | Germany |
| 1,200,843 | 8/1970 | United Kingdom........ 260/2.5 BE |
| 45-999 | 1/1970 | Japan |
| 45-36428 | 11/1970 | Japan |
| 1,165,252 | 3/1964 | Germany |
| 1,154,936 | 9/1963 | Germany |
| 1,502,050 | 11/1967 | France |
| 2,004,130 | 8/1971 | Germany |
| 1,129,202 | 10/1968 | United Kingdom........ 260/2.5 BB |

OTHER PUBLICATIONS

Chemical Abstracts; Vol. 73: 4829g; 1970.
Chemical Abstracts; Vol. 75: 141752g; 1971.

*Primary Examiner*—M. J. Welsh
*Assistant Examiner*—C. Warren Ivy
*Attorney, Agent, or Firm*—Walter C. Kehm

[57] ABSTRACT

Fire retardant polyurethanes and polyureas comprising the reaction product of a. an organic compound containing active hydrogen containing groups reactive with -NCO groups;

b. an organic polyisocyanate;

c. 2,3-dibromo-2-butenediol-1,4; and optionally having incorporated therein as stabilizer an epoxide; the polyurethane or polyurea having a bromine content of from about 4 to about 22 percent by weight, an NCO/OH ratio of about 0.95 – 1.15:1, and an NH group content of from about 2.5 to about 6.0 percent by weight. The polymers are not only fire retardant and non-burning but retain the advantageous physical characteristics of the polyurethane or polyurea.

21 Claims, No Drawings

FIRE RETARDANT POLYURETHANES AND POLYUREA-URETHANES HAVING IMPROVED PROCESSABILITY AND COLOR STABILITY

The present invention relates to novel thermoplastic polymers which are fire retardant and non-burning, have improved processability and color stability and to a method of making same; more particularly the present invention relates to thermoplastic polyurethanes and polyureas which in addition thereto may be readily injection molded while at the same time retaining the high level of physical characteristics associated with typical, flammable polyurethanes and polyureas.

Polyurethanes have become widely utilized for various purposes, including packaging films, diaphragms, gaskets, bearings, fibers and coatings. Generally, the use of the polyurethanes in the foregoing environments requires that the polyurethanes have excellent moldability, abrasion resistance, solvent resistance, ozone resistance and flexibility charactristics. In addition, it is preferable that the polyurethanes be fire retardant or non-burning.

Various proposals have been made for producing polyurethanes which are fire retardant or non-burning while still retaining the aforementioned properties. Such proposals generally utilize a halogen-containing compound having groups which react with isocyanates. For example, flame protective compounds of the Diels-Alder type which are miscible with polyesters have been proposed. In addition it has been proposed to utilize polyester intermediates based upon tetrachlorophthalic or dibromosuccinic acid. While such proposals are somewhat satisfactory with regard to the production of polyester polyurethanes, the importance of such previous proposals is declining in view of the tendency to use polyethers with free hydroxy groups to form polyurethanes. While halogen-containing polyethers may be produced and utilized to produce the polyurethanes, difficulties are experienced in adjusting the halogen content and the hydroxy number to one another and in molding the final product. This therefore is a further disadvantage of previous proposals.

In addition, wherein such halogen compounds are utilized as the fire retardant components in the production of the polyurethanes, it is generally required that large quantities of such components be present in the polyurethane composition. Generally, the presence of such large quantities of the halogen components gives rise to a reduction in the physical and mechanical characteristics and properties of the polyurethanes as well as discoloration. Accordingly, this cannot be tolerated in most processed parts.

Accordingly, industry has long sought a polyurethane which is fire retardant and non-burning yet possesses all of the inherant physical and mechanical properties of conventional, flammable polyurethanes. This has now been accomplished in accordance with the present invention.

It has been discovered in accordance with the present invention that the deficiencies of previously proposed fire retardant polyurethanes can be overcome through the provision of a polyurethane or polyurea prepared by reacting an organic compound having active hydrogen containing groups reactive with —NCO groups, an organic polyisocyanate, and 2,3-dibromo-2-butenediol-1,4, whereby the final polymeric product contains from about 4 to about 22 percent by weight bromine and the NCO/OH ratio is substantially stoichiometric.

Accordingly, it is a principal object of the present invention to provide novel polyurethanes and polyureaurethanes free from the drawbacks and deficiencies of previously proposed products and a novel method of producing same.

It is a further object of the present invention to provide such polyurethanes and polyurea-urethanes prepared by reacting an organic compound having active hydrogen-containing groups reactive with -NCO groups, an organic polyisocyanate, and 2,3-dibromo-2-butenediol-1,4 in the optional presence of a long chain α-olefin epoxide or melt blending the later after the product is formed.

A still further object of the present invention relates to such novel fire retardant and non-burning polyurethane or polyurea-urethane wherein the same has a bromine content of from about 4 to about 22 percent by weight and an α-olefin-epoxide content of from about 0.5 to about 7 percent.

A further object of the present invention relates to such novel non-burning and fire retardant polyurethanes and polyurea-urethanes having an NCO/OH ratio of from about 0.95 - 1.15:1 and an NH group content of from about 2.5 to about 6.0 percent by weight.

Still further objects and advantages of the present invention will become more apparent from the following more detailed description thereof.

The foregoing objects and advantages of the present invention are achieved by preparing a polyurethane or polyureaurethane utilizing as one of the reactants, 2,3-dibromo-2,-butenediol-1,4. It has been discovered in accordance with the present invention that when the foregoing compound is employed as a reactant to provide from about 4 to about 22 percent bromine in the final polyurethane or polyurea-urethane product, the product is not only non-burning or fire retardant but in addition retains all of the inherently good physical and mechanical characteristics of conventional flammable polyurethanes and polyurea-urethanes.

The term "polyurethane" as utilized throughout the instant specification relates to products generally produced by the reaction of a polyisocyanate with polyfunctional active hydrogen-containing compounds. The active hydrogen-containing compounds generally are polyethers or polyesters but may be other materials containing active hydrogen groups such as polycaprolactones, polyamines polyamides, polyacetals and polythiols. These polyurethane materials may be in the form of rubbers, foams, films, lacquers or flexible or stiff fibers. Thus, in accordance with the present invention the polyurethanes which can be produced as fire retardant and non-burning materials have the repeating unit of

Generally, the polyurethanes in accordance with the present invention are of the high strength type and have a molecular weight in excess of about 15,000.

In a similar manner, the poly(urea-urethanes) which are produced from an amine reactant generally have a repeating unit as follows:

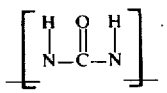

Obviously, poly(urea-urethanes) are within the scope of the present invention, the same having both of the above repeating units.

Polyurethanes are prepared by the reaction of a soft segment portion derived from an organic compound containing active hydrogen-containing groups and a hard segment derived from organic polyisocyanates. In accordance with the present invention, in the production of the polyurethanes and polyureas, the soft segment portions can be any of those generally employed, including, polyethers, polyesters, polyacetals, polyamines, polyamides, polyesteramides, etc. The polyethers which are employed as the active hydrogen-containing reactant are generally polyhydricpolyalkylene ethers or polyhydric-polythioethers. Any suitable linear or branched polyhydric polyalkylene ether may be used such as are obtained, for example, by the condensation of one or more mols of an alkylene oxide either alone or together with a polyhydric alcohol as well as those obtained from tetrahydrofuran and epihalohydrins such as epichlorohydrin. Any suitable alkylene oxide may be used, such as, for example, ethylene oxide, propylene oxide, butylene oxide, amylene oxide, styrene oxide and the like and mixtures thereof. It is also possible to prepare polyhydroxy polyalkylene ethers suitable for use in accordance with the present invention by reacting alkylene oxides such as those listed herein with aliphatic, hydroaromatic and/or aromatic polyfunctional amines, alcohols or mixtures, such as, for example, ethanolamine, diethanolamine, ethylene diamine, and the like as well as polycarboxylic acids such as adipic acid, hydroxy carboxylic acids such as ricinoleic acid, polycarboxylic acid amines such as, for example, pyridine 2,3-dicarboxylic acid and/or polycarboxylic acid sulphamides such as succinic acid disulphonamide and the like and mixtures thereof.

In addition to the foregoing, any suitable polyhydric-polythioether may be used in the production of the polyurethane by reaction with a polisocyanate. For example, such polyhydricpolyalkylene ether as set forth above with a thioether glycol, such as, for example, thiodiglycol, 3,3'-di-hydroxy-propylsulfide, 4,4'-dihydroxybutylsulfide, 1,4-(β-hydroxyethyl) phenylenedithioether, and the like.

The polyesters which are employed in accordance with the present invention can be any suitable linear or branched polyester, generally an alcoholic hydroxy terminated polyester obtained by the reaction of a polycarboxylic acid and polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, trimellitic acid, trimesic acid, phthalic acid, tetrachlorophthalic acid, mellophanic acid, prehnitic acid, pyromellitic acid, benzenepentacarboxylic acid, 1,4-cyclohexanedicarboxylic acid, 3,4,9,10-perylenetetracarboxylic acid and the like and mixtures thereof.

Any suitable polyhydric alcohol may be used such as, for example, ethylene glycol, propylene glycol, 1,4-butane diol, 1,3-butane diol, 1,6-hexane diol, dodec-9,10-ene-1,12-diol, thiodiglycol, 2,2-dimethyl propane-1,3-diol, 1,18-octadecane diol, 2-ethyl hexane-1,3-diol, 2,4-dimethyl-2-propyl heptane-1,3-diol, 2-butene-1,4-diol, 2-butyne-1,4-diol, diethylene glycol, triethylene glycol, glycerine, hexane-1,2,6-triol, triethanolamine, pentaerythritol, quinitol, sorbitol, hexahydropyrocatechol, 4,4'-dihydroxydicyclohexyl dimethylmethane, N-methyl diethanolamine and the like and mixtures thereof.

Also, polyhydroxy carboxylic acids, amino carboxylic acids, lactams and/or lactones may be used in the preparation of the polyesters including ricinoleic acid, hydroxystearic acid as well as dimerized and trimerized unsaturated fatty acids. The term "polyester" also includes polyester amides which may be obtained by including some amine such as ethylene diamine or one of the above-mentioned amino carboxylic acids in the reaction mixture.

As indicated above, the organic compound containing active hydrogen-containing groups may also be in the form of a polyacetal. Any suitable polyacetal may be used such as, for example, the reaction product of an aldehyde with a polyhydric alcohol. Any suitable aldehyde such as, for example, formaldehyde paraldehyde, butyraldehyde and the like may be used. Any of the polyhydric alcohols mentioned above in the preparation of the polyester may be used to prepare polyacetals.

Additionally, the polyamine may be any suitable polyamine such as, for example, ethylene diamine, aniline, p-aminoaniline, polymers of the type set forth above which have terminal primary or secondary amino groups and the like and mixtures thereof.

The polyamides which can be utilized in accordance with the present invention are linear polymers having repeating carbodiimide groups as an integral part of the polymeric chain. Such as polycarboxylic acid and polyamine, i.e., dicarboxylic acid and alkylene diamine. In addition, such polyamides can be prepared through the condensation polymerization of lactams. Similarly, the polyester amides utilized in accordance with the present invention can be prepared by conventional block copolymerization techniques.

In addition to the use of each of the above organic compounds containing active hydrogen containing groups reactive with NCO groups, it is obvious that the polyurethanes or polyureas of the present invention can be produced from mixtures of organic compounds. Accordingly, it is quite possible to employ, for example, mixed ether-ester reactants in the production of the polyurethane. In addition, it should be recognized that the polyalkylene ethers and linear polyesters are preferred in accordance with the present invention.

In the preparation of the polymers of the present invention, the soft segment, i.e., organic compound having active hydrogen-containing groups reactive with NCO groups, is reacted with an organic isocyanate, i.e., polyisocyanate, preferably a diisocyanate. The following are examples of suitable polyisocyanates, which can either be used alone or in any desired mixture: Aliphatic diisocyanates, of the general formula OCN—R—NCO, wherein R represents a linear or branched, saturated or unsaturated alkylene radical, which can also be interrupted by hetero atoms such as oxygen or sulfur. Examples of these are tetra-or hexamethylene diisocyanates, butene diisocyanates, dithiodiethyl or thiodipropyl diisocyanates, 2,2-dimethylpentane diisocyanate, omega,omega'-dipropyl-ether diisocyanate, 1,4-butylene glycol dipropyl ether diisocyanate and the like. Aliphatic diisocyanates with built-in ring systems such as, for example, omega,omega'diisocyanate-1,4-dimethylcyclohexane, omega,omega'-diisocyanate 1,4-diethyl benzene and the like and mixtures thereof.

Hydroaromatic diisocyanates may be the organic polyisocyanate such as cyclohexane-1,3 or cyclohexane-1,4-diisocyanates, 1-methyl-cyclohexane-2,4-diisocyanates, dicyclohexyl methane-4,4'-diisocyanate, 2,2'-dimethyl-dicyclohexyl methane4,4'-diisocyanate and the like and mixtures thereof.

Aromatic-aliphatic or aromatic-hydroaromatic diisocyanates may be the organic polyisocyanate such as 4-phenyl isocyanate-$\beta$-ethyl isocyanate, hexahydrobenzidine-4,4'- or hexahydrodiphenyl methane-4,4'-diisocyanates, 3-phenyl isocyanate-$\alpha$-ethyl isocyanate and the like and mixtures thereof.

Diisocyanates of benzene and its homologues such as 1,3- or 1,4-phenylene diisocyanates, 1-alkyl benzene-2,4-, 2,6-, 2,5-, 3,5-diisocyanates, 2,4-and 2,6-diisocyanates, e.g. toluylene, 1-methyl-3,5-diethylbenzene-2,4-diisocyanate, diisopropyl benzene diisocyanate and the like may be used, and mixtures thereof.

Diisocyanates of substitution products of benzene may be used, such as, for example, 1-chlorobenzene-2,4-diisocyanate, dichloro-benzene diisocyanates, 1-nitrobenzene-2,4-diisocyanate, 1-methoxy-benzene-2,4 - diisocyanate, azobenzene-4,4'-diisocyanate, diphenylether-4,4'diisocyanate and the like and mixtures thereof. Diisocyanates of naphthalene such as naphthalene-1,4-, 1,5- and 2,6-diisocyanates and the like may be used, and mixtures thereof. Diisocyanates of biphenyl or deriving from diphenylmethyldiphenyl-4,4'-diisocyante, diphenylmethane-4,4'-diisocyanate, diphenyl-dimethylmethane diisocyanates, benzophenone3,3'-diisocyanate and the like may be used, and mixtures thereof. In addition, diisocyanates of polynuclear ring systems such as 1,5-naphthalene diisocyanate and the like sulphur-containing aromatic diisocyanates, such as p,p'-diisocyanato-diphenyl sulfide, triisocyanates and tetraisocyanates, such as 1-methyl-benzene2,4,6-triisocyanate, triphenyl methane-4,4'-4''-triisocyanate, 2,2',4,4'-diphenylmethane tetraisocyanate and the like and mixtures thereof may be used. In accordance with the present invention, aromatic diisocyantes and cycloaliphatic diisocyanates are preferred where the epoxide is employed. When not employed, the stability may be imparted to the product by using an aliphatic or cycloaliphatic polyisocyanate.

Any suitable $\alpha$-olefin epoxide or alkylaryl epoxide may be employed as stabilizer, such as those having the formulae:

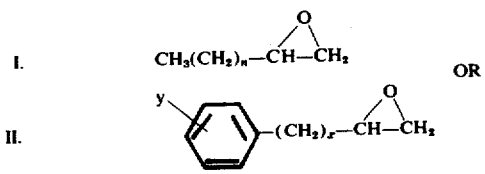

I. $CH_3(CH_2)_n-CH-CH_2$ with O bridge

OR

II. benzene ring with Y and $(CH_2)_x-CH-CH_2$ with O bridge

Y= H, $C_1$ to $C_{12}$ alkyl, $C_1$ to $C_4$ alkoxy, or halogen substituent $x$ can vary between 0 and 4, $n$ can vary between 0 and 25.

The stabilizer of the invention can be incorporated or blended into polyurethane compositions by any of the conventional methods used for blending such materials into resins or plastics. Typical of such methods that can be suitably employed include milling on heated rolls, deposition from solvents, and dryblending.

The stabilizer of the present invention leads to polyurethane compositions having improved stability, and more specifically, improved stability against deterioration resulting from exposure to heat or to sunlight or ultraviolet light. Thus, polyurethane stabilized in accordance with the invention either by the epoxide-polyisocyanate combination or by the isocyanate selection alone have an extended life expectancy and can be used more effectively than unstabilized polyurethane for a wide diversity of uses, including outdoor requiring prolonged exposure to the elements. Polyurethanes stabilized in accordance with the invention can be cast, extruded, rolled or molded into sheets, rods, tubes, piping, filaments and other shaped articles. Likewise, small amounts of other additives such as other polymers, resins or plastics, as well as other stabilizers or inhibitors, that are commonly added to polyurethanes for specific uses are not deleterious to the effectiveness of the present inventive combination. The technique one would expect to employ involves premixing hydroxyl containing reactant and additives (including an $\alpha$-epoxide) in a melted state and adding molten isocyanate. Unfortunately, by this procedure NCO and epoxide react to some extent necessitating addition of extra isocyanate to compensate. However, even this expedient has limitations because the side reaction "kills off" one of the NCOs in the preferred bifunctional isocyanate, and consequently functions as a chain terminator. Even with extra diisocyanate the inherent mechanism of condensation polymerization precludes increasing molecular weight sufficiently to generate useful, high strength products, when too many termination have occured.

In accordance with this invention it is possible to add 0.5 to 7 percent of the by weight epoxide at any time during the reaction, however, it is preferred that same be added to partially polymerized polyurethane no sooner than about the final fourth of the reaction sequence. If the epoxide is added initially, a side reaction between epoxide and isocyanate (NCO) groups leads to an inferior product. As stated, it may also be post added to the product. Such a point in the reaction may be determined by measuring the increase in viscosity of the reaction melt; knowing the given viscosity of a particular product, vis-a-vis molecular weight. A viscometer may be incorporated in the system or visual determination may be employed. An infrared sample cell may also be employed in such a manner that at any given moment the operator can determine how much unreacted isocyanate remains in the reaction used.

The addition to the reaction mixture of modest amounts of said epoxide effectively reduces discoloration, facilitates processing, especially into thin sheets and in injection molding composition and generally provides for a more workable and easily handled composition.

As stated, it is preferred to introduce the epoxide additive onyl after the NCO/OH reaction has been largely completed; 67 percent complete, preferably 85 percent to 100 percent complete. The principal advantage of incorporating epoxide at about 67 percent is to minimize the time that the polymer melt remains without stabilizer, and to permit more efficient mixing while the polyurethane molecular weight is still low.

Any storage system(s) that can hold reagents can be used. Any metering device that will feed equal amounts of NCO and OH to within +0.5 percent should be operable. As the epoxide additive comprises only 1 percent of the system, in most cases ±10 percent control should suffice.

The mixer should ideally fully homogenize the hydroxyl feed stream and NCO feed stream. However, the polymerizer can function to overcome some inhomogeneities. The mixture should be preheated 120°C. to avoid plate out of reactants when the system is started up. The residence time in the mixer must be sufficiently short to avoid polymer build up within the mixer (15 seconds or less). Almost any polyurethane mixer should work: a) mechanically agitated high shear helix, b) high pressure low speed mixer, "T" mixers relying on turbulant flow for mixing, or c) a combination mechanical high velocity inlet gas system.

The polymerizer itself can be any device which will maintain the polyurethane in a molten state, 100°C. for very soft polymers to 200°C for higher melting ones. The 180°–195°C range is preferred as being not too high to decompose the polyurethane yet sufficiently high to permit a moderately short residence time for effecting complete polymerization. Depending on speed of polymerization, 1 min. to 15 min. residence may be needed. The shorter time would pertain to catalyzed systems or amine extended polyurethanes which react very rapidly. The longer time would be needed for sluggish reactants, e.g. aliphatic isocyanates or hindered diols. In most work, 3 to 5 min. residence time is utilized. An important reactor feature is virtually complete elimination of dead spots and other areas where molten polymer would be held up for 15 min. or more. Dibromobutenediol polyurethanes, even stabilized, will turn brown if left in contact with hot reactor or die surfaces for prolonged periods of time. These "char" deposits gradually work free and deposit themselves in the polymer mainstream contaminating the product. Use of self wiping screws or blades can be a satisfactory way of preventing undesirable build up within the polymerizer. In practice most char problems arise in the die affixed to the exit of the polymerizer.

The epoxide additive can be introduced in the polymerizer as a solid or as a liquid. The point of introduction will be governed by the speed of the NCO/OH reaction. For a given length polymerizer, a faster reaction will be 85 percent complete, closer to the feed end than a slower reaction. In a practical sense the sooner the additive is introduced the sooner it can start to "stabilize." In addition, the additive will be more certain of homogeneous blending if a reasonable number of mixing paddles are available beyond the addition point. Any of a wide range of post reactor finishing techniques can be used to handle and shape the polymer after it leaves the polymerizer. Although the preferred route is a continuous process, delayed additive addition can also be practiced in a batch process.

As indicated above, the organic compound containing active hydrogen-containing groups reactive with -NCO groups may be reacted with the organic polyisocyanate 2,3-dibromo-2-butenediol-1,4 in the presence of said late added epoxide.

The 2,3-dibromo-2-butenediol-1,4 is present in the reaction system in an amount so as to provide a bromine content in the final polyurethane or polyurea of from about 4 percent to about 22 percent by weight. In this regard, it has been found in accordance with the present invention that as little as about 4 percent by weight bromine provides non-burning and fire retardant characteristics to the polyurethane or polyurea. In addition, it has been discovered that if the amount of bromine is increased to an amount appreciably in excess of about 22 percent by weight, no appreciable increase in the non-burning and fire retardant characteristics of the polymer are observed and higher bromine contents often cause some decrease in the physical and mechanical characteristics of the basic polymer i.e, discoloration, poor moldability, etc. Preferably, the bromine content of the polyurethane or polyurea should be from about 10 to about 18 percent by weight. It is preferred in accordance with the present invention that the polyurethanes and polyureas have a molecular weight of at least about 15,000 in order to provide the same with a sufficiently high strength. To achieve this molecular weight it is important in accordance with the present invention that the condensation reaction in the preparation of the polyurethane be carried out with a ratio of —NCO groups and —OH (or other active hydrogen) groups maintained at close to a 1:1 stoichiometric equivalent, a ratio of —NCO to —OH groups from about 0.95 – 1.15:1 being suitable, about 0.98 – 1.02 is preferred. To provide this ratio within the above prescribed limits, in addition to the polymeric diols discussed previously, it is often necessary to introduce into the reaction system an additional hydroxy containing compound, i.e., monohydric or polyhydric alcohol as a chain modifying agent. The monohydric alcohols may be linear, branched, saturated or unsaturated alkyl, cycloalkyl, arylalkyl or aryl alcohols which may also contain hetero atoms or other substituents. For example, representative examples of such materials include such as: ethanol, butanol, neopentanol, n-octanol, iso-octanol, n-decanol, 2-methyl-butane-4-ol, allyl alcohol, octadec-9-en-1-ol, fatty alcohols with 12 to 20 carbon atoms, cyclohexanol, benzyl alcohol, phenylethyl alcohol, phenol, cresols, xylenols, para-alkylphenols, and the like and mixtures thereof. However, usually no more than 5 equivalent percent of the total active hydrogen can be imparted by a monofunctional modifier or properties will be significantly decreased.

The polyhydric alcohol which can be utilized to maintain —NCO/OH ratio within the prescribed limits can comprise any of the polyhydric alcohols described previously with regard to the formation of the polyester soft segment of the polyurethane. Such monohydric and polyhydric alcohols, as well as the organic compound containing active hydrogen-containing groups and organic polyisocyanates are present in the reaction system in an amount so as to maintain the —NCO/OH ratio within the aforementioned limit, i.e., within the range of about 0.95 – 1.15:1. When this ratio is maintained within the above range, high molecular weight polyurethanes are produced possessing excellent strength.

To prepare the polyurethanes and polyureas, it is seldom necessary to use accelerators or catalysts, although, where desired, any conventional accelerator in the production of polyurethanes and polyureas can be utilized. Suitable accelerators include, for example, metal compounds which may be either organic or inorganic such as, for example, stannous chloride and dibutyl tin dilaurate, tertiaty amines such a N-ethylmorph-line and the like and other compounds such as, for example, sodium methylate, potassium ethylate, etc. It should be noted again, however, that in accordance with the present invention such accelerators or catalysts are generally not necessary.

The polyurethane and polyurea products of the present invention may be in any conventional form, e.g. films, diaphragms, fibers, coatings, etc. In addition, the polyurethanes may be formed as cellular products. The production of cellular products involves the employment of a blowing agent, of which any suitable blowing agent, such as, water, haloalkanes, i.e., trichlorofluoromethanes, and the like may be utilized. In addition, other suitable auxiliary substances such as emulsifiers may be advantageously incorporated in the reaction mixture in producing the polyurethane or polyurea product.

Additionally, the polyurethanes of the present invention should have at least a minimum quantity of NH groupings, derived from the isocyanate, in a given volume of product. Such units provide the so-called "hydrogen bonds" which are largely responsible for the strength of the polyurethane. It has been discovered in accordance with the present invention that polyurethanes of excellent tensile strength and other mechnical and physical properties are obtained when the NH groupings are present in an amount of from 2.5 to about 6.0 percent by weight of the composition. Where desired for particular applications, however, a slightly lesser or greater amount of the NH groupings can be present in the polyurethane.

As indicated previously, it is a principal object of the present invention to provide polyurethanes and polyureas which are flame retardant and non-burning and in addition retain the excellent physical and mechanical characteristics of the conventional flammable polymer. This has been achieved in accordance with the present invention by following the parameters set forth above.

The present invention will now be illustrated by reference to the following examples. It is to be understood that such examples are presented for purposes of illustration only and the presentinvention is in no way to be deemed as limited thereto.

EXAMPLE 1

Preparation of polyester-polyurethane with epoxide

A polyester-polyurethane is produced from the following reactants employed in the amounts recited:

| | | |
|---|---|---|
| Poly(1,4-butanediol adipate) | 317.1 gm. | 0.598 equivalent |
| 2,3-Dibromo-2-butenediol-1,4 | 119.5 gm. | 0.972 equivalent |
| n-Dodecanol | 7.9 gm. | 0.040 equivalent |
| 4,4'-diphenylmethanediisocyanate | 256.6 gm. | 2.050 equivalent |
| 1,4-butanediol | 19.4 gm. | 0.431 equivalent |
| $C_{14-16}$ α-olefin epoxide (UCC)1% | 4.6 gm. | — |
| UVI-NOX 1494 phenolic antioxidant (2.2 %) | .9 gm. | — |

In producing the polyester-polyurethane, the polyester; 2,3-dibromo-2-butenediol-1,4; dodecanol and additives are placed in a predried 500 ml. resin jar. The temperature of the resin jar is raised by means of an oil bath held at a temperature of about 175°C. When the temperature of the molten reactant mixture reaches about 110°C., a stainless steel agitator is turned on, and when 4,4'-diphenylmethanediisocyanate (45°C±) is syringed into the resin jar, and exothermic reaction is initiated, the temperature of the melt reaching 190°C in 3 minutes. Near the end of the reaction the $C_{14-16}$ α-olefin epoxide is added. Stirring is maintained for an additional 3 minutes after which the melt is transferred to a polytetrafluroethylene lined pan and oven cured for 1 hour at 150°C.

The product through the above procedure has a very light colar and possesses excellent tensile and elongation properties and contains 10.7 percent bromine. When tested, the polyurethane is found to be non-burning.

EXAMPLE 2

Preparation of polyether-polyurethane with Epoxide

Following the procedure of Example 1 a polyether-polyurethane is produced by varying only the following components:

| | | |
|---|---|---|
| Poly(tetramethyleneether glycol)mw=989 | 319.1 gm. | .645 equivalent |
| 2,3-Dibromo-2-butenediol-1,4 | 119.5 gm. | .972 equivalent |
| 1,4-Butanediol | 17.3 gm. | .385 equivalent |
| n-Dodecanol | 3.7 gm. | .02 equivalent |
| $C_{14-16}$-α-olefin epoxide | 4.6 gm. | — |
| 4,4'-diphenylmethanediisocyanate; 2% excess for losses | 252.6 gm. | 2.020 equivalent |

The polyurethane has a bromine contant of 12.2 percent by weight and is found to be non-burning, and possesses excellent physical properties, like that of Example 1.

EXAMPLE 3

Preparation of polyester-polyurethane with Epoxide

Following the procedure of Example 1 a further polyesterpolyurethane is produced utilizing a cycloaliphatic diisocyanate instead of the aromatic diisocyanate of Example 1. The polyesterpolyurethane is produced by varying only the following components:

| | | |
|---|---|---|
| Poly(1,4-butanediol adipate) | 110.7 gm. | .173 equivalent |
| 2,3-Dibromo-2-butenediol-1,4 | 48.8 gm. | .197 equivalent |
| n-Dodecanol | 1.3 gm. | .007 equivalent |
| $C_{14-16}$-α-olefin epoxide | 1.3 gm. | — |
| 4,4'-dicyclohexylmethanediisocyanate | 99.7 gm. | .380 equivalent |
| Dibutyltin Dilaurate | .03 gm. | — |

When the flammability of this polyester-polyurethane is tested, the same is found to be non-burning. The polyurethane has a bromine content of 12.1 percent by weight and possesses the same excellent physical properties.

EXAMPLE 4

Measurement of physical characteristics of polyurethanes of Examples 1-3:

The polyurethanes produced in Examples 1-3 are tested to determine their strength, elongation percentage, tear strength, color and other chemical and physical characteristics, with the results appearing in Table I. Additionally incorporated in Table I are similar characteristics of commercial polyurethanes, i.e., Extane 58101 and Estane 58105.

TABLE I

|  | Polyurethane Properties | | | | |
|---|---|---|---|---|---|
|  | Estane 58101 Commercial Polyurethane | Estane 58105 Commercial Polyurethane | Example 1 | Example 2 | Example 3 |
| Bromine, wt.% | None | None | 11.0 | 11.0 | 12.1 |
| NH (Dumas), wt.% | 4.25% | 4.66% | 4.25 | 4.28 | 4.44 |
| Hardness, Shore D (Astm D 676,55T) | 43 | 47–49 | 46 | 42 | 38 |
| Softening Range (Fisher-Johns),°C. | 175–179 | 170–180 | 175–179 | 178–182 | 83–86 |
| Relative Viscosity, 1% NMP, 25°C. | 2.10 | 2.60 | 2.20 | 1.95 | 1.60 |
| Limiting Oxygen Index (ASTM D2863T), %Oxygen | 20. | 19. | 27. | 28. | 24. |
| Tensile Strength (ASTM D412–64T), PSI | 7500 | 7900 | 7620 | 6867 | 5988 |
| 100% Tensile Modulus (ASTM D412–64T), PSI | 1400 | 2000 | 1932 | 1688 | 2130 |
| 300% Tensile Modulus (ASTM D412–64T), PSI | 3350 | 4300 | 4213 | 3775 | 5118 |
| Break (ASTM D412–64T),Elongation % | 650 | 525 | 514 | 595 | 376 |
| Graves Tear (ASTM D624–64T), Lb./In. | 720 | 825 | 726 | 692 | 801 |
| Hunter Color, YI per mil | .50–.65 | .60 | .39 | 0.42 | .09 |

It can be seen from the data in Table I, that the physical characteristics of the polyurethanes of Examples 1–3, approximate those of the non halogenated commercial polyurethane tested. However, due to the fact that the polyurethanes of Examples 1–3 contain 11.0, 11.0 and 12.1 percent by weight bromine, respectively such polyether and polyester-polyurethanes are non-burning and fire retardant. Accordingly, it can be seen that it is possible to produce polyurethanes which are non-burning and in which the physical characteristics inherent in polyurethanes arenot substantially deteriorated.

EXAMPLE 5

The procedure of Example 1 is repeated except that the organic compound containing active hydrogen groups is replaced with the following materials:
a. polypropylene glycol ether (OH number 56);
b. polyesteramide of hexane-(1,6)-diol, caprolactam and adipic acid (OH number 58);
c. poly(ethylene phthalate) glycol;
d. polyethylene glycol ether (OH number 73);
e. poly(1,7-heptane sebacate);
f. poly (1,5-pentanediol succinate).

In all cases, a polyurethane or polyurea having excellent physical characteristics is produced, the polymer having a bromine content ranging from about 6 to about 20 percent by weight. All of the polymers are found to be non-burning.

EXAMPLE 6

The procedure of Example 1 is again repeated except that the organic diisocyanate is replaced with the following materials:
a. thiodipropyl diisocyanate;
b. 1,4 butylene glycol dipropyl ether diisocyanate;
c. 1,3 phenylene diisocyanate;
d. 1,4 phenylene diisocyanate; and
e. diisopropyl benzene diisocyanate.

Polymers having properties substantially the same as those of the produce of Example 1 are produced.

EXAMPLE 7

The procedure of Ex. 1 is repeated using the following formation, for producing an unstabilized and stabilized Br₂B₂D polycaprolactone polyurethane respectively:

| 11% Bromine | 7A Grams | 7A Equiv. | 7B Grams | 7B Equiv. |
|---|---|---|---|---|
| Polycaprolactone U.C.C. D540 | 312.4 | .495 | 312.4 | .495 |

| 11% Bromine | 7A Grams | 7A Equiv. | 7B Grams | 7B Equiv. |
|---|---|---|---|---|
| MW = 1262 |  |  |  |  |
| 2,3-Dibromo-2-butenediol-1,4 | 119.5 | .968 | 119.5 | .968 |
| 1,4-Butanediol | 24.2 | .537 | 24.2 | .537 |
| C₁₄₋₁₆ α-Olefin Epoxide(UCC) | None | — | 7.1 | — |
| 4,4'-diphenylmethanediisocyanate | 248.9 | 1.990 | 250.1 | 2.000 |

EXAMPLE 8

The procedure of Example 1 is repeated using the following components to produce a polyether-polyurethane containing 11 percent bromine.

|  | Grams | Equiv. |
|---|---|---|
| Poly(tetramethyleneether glycol)MW=989 | 319.1 | .645 |
| 2,3-Dibromo-2-butenediol-1,4 | 119.5 | .972 |
| 1,4-Butanediol | 17.3 | .383 |
| Neodol 23(Shell Chemical Co.) | 3.9 | .02 |
| Mixture of C₁₂ and C₁₃ primary alcohols |  | 2.0200 |
| C₁₄-C₁₆-α-olefin epoxide (U.C.C.) 1% | 4.6 | — |
| 4,4'-diphenylmethanediisocyanate | 252.6 | 2.0200 |

EXAMPLE 9

Measurement of physical characteristics of polycaprolactonepolyurethanes of Example 7

The polyurethanes produced in Example 7 with and without the epoxide are tested to determine their tensile strength, elongation percentage, tear strength, color and other chemical and physical characteristics, with the results appearing in Table II.

TABLE II

|  | Control | with epoxide |
|---|---|---|
| Ease of thin film molding | Fair | Excellent |
| Ease of forming dumbbells | Excellent | Good |
| Ease of thick disc forming | Good | Excellent |
| Color of molded part | Yellow Brown | Pale Yellow |
| Shrinkage, % | 4.5 | 2.6 |
| Break tensile, psi | 5673 | 5855 |
| Break elongation, % | 385 | 497 |
| Hardness, Shore D | 48 | 45 |

The above units are obtained by following the procedure outlined below.

Thin (25 Mil) sheets, medium thick (1/16 inch) tensile test dumbbells and relatively thick (½ inch) 1-inch diam. discs are injection molded on a Van Dorn RS-50 reciprocating screw injection molding machine. Ability to completely fill the mold over at least a modest range of molding conditions is used as a criteria for evaluating "ease" of molding. The epoxide modified variation, as is readily apparent, rates considerably higher than the control. Shrinkage and color formation are also reduced.

EXAMPLE 10

The following procedure outlines the continuous process. The concept is further proved out in a semi-continuous steel polymerizer, a Teledyne Readco 2 inches diameter twin screw "Processor." This is a hot oil jacketed device capable of transporting polymer from a feed hopper, melting the feed, smearing the polymer against the heated chamber wall for temperature control, mixing in additives (if used) and forcing the product through an exit port at the terminal end of the processor. The Readco polymerizer is a laboratory unit that could be fitted with various mixer blades and screws. The internal configuration for this run consists of 10 linear inches of self cleaning screws at the hopper end, 2½ inches wide self cleaning coated paddles, 6 additional inches of screws to force product out the exit, and a liquid inlet port opened above the hopper screws, just in front of the mixing paddles. The α-epoxide additive is introduced at this point and subsequently homogenized into the resin melt.

The starting materials are handled as three separate feeds. The first contains polymeric diols (polybutanediol adipate,1,6-hexanediol; 1,4-butanediol and 2,3-dibromo-2butenediol-1,4) and nonreactive additive ("Stabaxol I" polycarbodiimide). The second contains molten MDI. These are stored in heated stainless steel storage cylinders at 80°C. and 50°C respectively. A Lapp Quadruplex Pulsafeeder pump is used to meter these two streams to a small "T" junction which passes the semi-combined streams to a small mechanical mixer with a close fitting, flat cross shape agitator rotating at about 7,000 rpm. Corresponding pump heads, valves, gauges and lines are maintained at the same temperature as feed storage by means of electrically controlled heating tapes. The moderately hot liquid stream exiting from the mixer is fed to to the hopper of the processor as a fluid liquid. The third component, α-epoxide, is added to the partially polymerized melt in the processor. By the time the melt has reached the mix paddles, at the 190°C wall temperature used, melt viscosity is already moderately high indicating that most of the NCO has already been consumed in the desired polyurethane forming reaction. Some slight further viscosity build up developes in presence of the epoxide after the mixing paddles.

Polyurethane exiting from the processor is forced through a ⅜ inch diam., 5 hole die. The hot extrudate is passed into an ice water bath, air cooled slightly further in air on a 4 ft. long moving belt and collected as ⅛ inch diameter continuous strands. These are subsequently cut into ⅛ inch high cylinders with a "Killion" strand cutter.

Polyurethane pellets obtained in this manner can be injected molded, extruded, pressed to film, dissolved or otherwise formed to finished or semi-finished products.

The specific composition prepared consist of the following:

| Cylinder A | Amount | Equi-valents |
|---|---|---|
| Poly(1,4-butanediol adipate)MW=1109 | 20,814 g. | .6585 |
| 1,6-Hexanediol | 365 | .1088 |
| 1,4-Butanediol | 200 | .0777 |
| 2,3-Dibromo-2-butenediol-1,4 | 8,094 | 1.1550 |
| | | 2.000 |
| Stabaxol I polycarbodiimide(Naftone Inc) | 351 | — |
| Cylinder B | | |
| MDI Upjohn Isonate 125 MF | 14,256 | 2.0000 |
| Cylinder C | | |
| $C_{14-16}$ α-Olefin Epoxide (U.C.C.) (1%) | 438 | — |

The resulting polyurethane elastomer does not burn under horizontal ignition (ASTM 635-68). Compression molded 25 mil films are quite transparent and almost colorless. The product is highly elastomeric, pliable and of high strength.

TABLE III

| Physical Properties of 11.7% Bromine Polyurethane | | |
|---|---|---|
| | Ex 10 11.7% Bromine | Estane 58101** |
| Hardness, Shore D | 45 | 40–42 |
| Softening Range, °C | 160–163°C | 174–178 |
| Relative Viscosity, 1% in NMP*(25°C) | 3.04 | 2.2 |
| Hunter Color, Yellowness Index, YI/mil ASTM D-1925 | 0.46 | 0.50–0.62 |
| Tensile Strength, PSI ASTM-D-412-64T | 8,698 | 7700 |
| 100% Tensile Modulus, PSI ASTM-D-42-64T | 1,348 | 1500 |
| 200% Tensile Modulus, PSI ASTM-D-412-64T | 2,565 | 2100 |
| 300% Tensile Modulus, PSI ASTM-D-412-64T | 4,830 | 3400 |
| Elongation at Break, % ASTM-D-412-64T | 436 | 590 |
| Tear-Die C, lb./in. ASTM-D 624 | 648 | 727 |
| Oxygen Index, ASTM-D-2863 | 31 | 19 |
| Compression Set,%,ASTM-D-395B (Calculated on basis of original thickness) | 20 | 18 |
| Change in tensile after boiling in $H_2O$ × 70 hrs., % | −11% | −35% |
| Change in tensile after oven drying 130°C × 7 days, % | −24% | −26% |

*N-methyl pyrrolidone
**commercial polyurethane B.F. Goodrich

EXAMPLE 11

Polyurethane stabilized by polyisocyanate and the addition of epoxide.

|  | Grams | Equi-valents |
|---|---|---|
| 2,3-Dibromo-2-butenediol-1,4 | 142.0 | 1.155 |
| Poly(1,4-butanediol adipate)MW=1109 | 365.2 | .659 |
| 1,4-Butanediol | 3.5 | .078 |
| 1,6-Hexandiol | 6.4 | .109 |
| $C_{14}$-$C_{16}$-α-olefin epoxide | 7.7 | — |
| 4,4'-diphenylmethane diisocyanate 85 }  4,4'-dicyclohexane diisocyanate 15 | 254.4 | 2.020 | ide selected from the group consisting of compounds having the formula

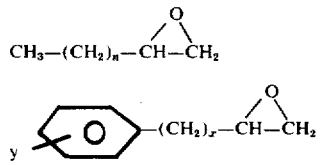

TABLE IV

| Polyester-Polyurethane with polyisocyanate % | Example | Tensile PSI | Bromine wt.% | Hunter Color, 0 Hr. | YI per mil 20 Hrs. | Weather-O-Meter 40 Hrs. |
|---|---|---|---|---|---|---|
| 100% MDI | A | 10,000 | 12 | .41 | 4.13+ | + |
| 85/15 MDI/$H_{12}$MDI | B | 9,000 | 12 | .18 | .98 | 1.30 |
| 75/25 MDI/$H_{12}$MDI | C | 9,800 | 12 | .17 | .70 | .98 |
| 100% $H_{12}$MDI | D | 2,000 | 14 | .32 | .43 | .46 |
| "Estane"5707 | E(Commercial) | 7,900 | None | .22 | .50 | .72 |
| "Texin"480A | F(Commercial) | 7,000 | None | .30 | 1.22 | 1.55 |

+Greater than 100% on the Hunter Scale.

| Properties |  |
|---|---|
| Bromine % | 12.0 |
| NH% | 3.9 |
| Relative viscosity, 1% in NMP | 2.03 |
| Hardness, Shore D | 40.0 |
| Softening Range, °C | 157–160 |
| Oxygen Indes, % Oxygen | 28 |
| Tensile Strength, PSI | 8962 |
| 100% Tensile Modulus, PSI | 1312 |
| 300% Tensile Modulus, PSI | 4115 |
| Break, Elongation, % | 489 |
| Hunter Color, YI/mil | 0.18 |

Physical properties of the partially substituted (with $H_{12}$MDI) PU's are fully equivalent to 100 percent MDI counterparts.

It can be seen from the foregoing that the present invention effectively provides polyureathanes and polyureas which are not only non-burning but, in addition retain all of the inherently good physical characteristics of a flammable polymer. Such characteristics of the present invention are associated with the employment of 2,3-dibromo-2-butenediol-1,4 together with conventional polyurethane reactants.

While the present invention has been described primarily with respect to the foregoing exemplification, it should be understood that the present invention is in no way to be deemed as limited thereto but, rather, must be construed as broadly as all or any equivalents thereof.

I claim:

1. A fire retardant polyurethane or polyurea composition having improved processability and color stability comprising the reaction product of:
   A. an organic compound component containing a plurality of active hydrogen-containing groups reactive with -NCO groups;
   B. an organic polyisocyanate component; and
   C. 2,3-dibromo-2-butenediol-1,4, said reaction product having:
      i. a bromine content of from about 4 to about 22 percent by weight;
      ii. an NCO/OH ratio of about 0.95 – 1.15:1; and having incorporated therein as stabilizer 0.5 to 7 percent by weight of the components of an epoxide selected from the group consisting of compounds having the formula and
   wherein y = H, $C_{1-12}$ alkyl, $C_{1-4}$ alkoxy or halogen, x = 0 to 4 and n = 0 to 25.

2. A composition according to claim 1 having a molecular weight of at least 15,000.

3. A composition of claim 1 wherein compound (A) is selected from the group consisting of polyesters, polyesters, polyacetals, polyamines, polythiols, polyamides, polycaprolactones, and polyesteramides.

4. A composition according to claim 3 wherein compound (A) is a linear polyether.

5. A composition according to claim 4 wherein said polyether is poly(tetramethyleneether) glycol.

6. A composition according to claim 3 wherein compound (A) is a linear polyester.

7. A composition according to claim 6 wherein said polyester is OH-terminated poly (1,4-butanediol adipate).

8. A composition according to claim 3 wherein compound (A) is a linear polycaprolactone.

9. A composition according to claim 1 wherein said polyisocyanate is selected from the group consisting of aliphatic, cycloaliphatic and aromatic diisocyanates.

10. A composition according to claim 1 wherein said epoxide is included in amounts of from about 0.5 to about 5 percent.

11. A composition according to claim 10 wherein said polyisocyanate is an aromatic diisocyanate.

12. A composition according to claim 11 wherein said aromatic diisocyanate is 4,4'-diphenylmethanediisocyanate.

13. A composition according to claim 10 wherein said polyisocyanate is an alicyclic diisocyanate.

14. A composition according to claim 13 wherein said alicyclic diisocyanate is 4,4'-dicyclohexylmethanediisocyanate.

15. A composition according to claim 10 wherein said polyisocyanate is an aliphatic diisocyanate.

16. A composition according to claim 15 wherein said aliphatic diisocyanate is α, omega-hexamethylenediisocyanate.

17. A composition according to claim 9 wherein said polyisocyanates is a mixture of aromatic and alicyclic polyisocyanates and contains up to about 85 percent by weight of said polyisocyanates of aromatic polyisocyanate.

18. A composition according to claim 1 wherein said polyurethane or polyurea has an NH group content of about 2.5 to about 6.0 percent by weight.

19. A composition according to claim 1 wherein said polyurethane or polyurea has a bromine content of about 10 percent to about 14 percent by weight.

20. A composition according to claim 1 wherein said epoxide is a mixed $C_{14-16}$ α-olefin epoxide.

21. A process for preparing the polymer of claim 10, comprising reacting said components (A), (B) and (C) and adding said epoxide (1) to the reaction medium after the reaction is at least 3/4 completed, or (2) to the completed reaction product.

* * * * *